United States Patent [19]

McConnell

[11] 4,287,960
[45] Sep. 8, 1981

[54] MOTORCYCLE CONVERSION KIT

[76] Inventor: Harold McConnell, Box 15, Bald Knob, Ak. 72010

[21] Appl. No.: 80,021

[22] Filed: Sep. 28, 1979

[51] Int. Cl.³ .................. B62K 13/04; B62D 61/08
[52] U.S. Cl. ............................. 180/16; 180/209; 180/217; 280/282; 280/283
[58] Field of Search ............ 180/209, 16, 217, 215; 280/283, 282

[56] References Cited

U.S. PATENT DOCUMENTS

| | | | |
|---|---|---|---|
| 1,933,101 | 10/1933 | DuPont | 180/16 |
| 1,933,102 | 10/1933 | DuPont | 180/209 |
| 1,956,319 | 4/1934 | DuPont | 180/16 |
| 2,995,378 | 8/1961 | Whetstone | 280/282 |

Primary Examiner—John P. Silverstrim
Attorney, Agent, or Firm—Stephen D. Carver

[57] ABSTRACT

A bolt-on kit for converting conventional two-wheel motorcycles to three wheel form. The kit comprises an elongated axle assembly which is adapted to be coupled to the motorcycle and which receives the original equipment drive gear for rotation, a pair of spaced apart mounting plates coupled to the axle, support means for rigidly coupling the mounting plates to the motorcycle frame, a pair of drive hubs for mounting drive wheels at opposite ends of the axle assembly, and unique stabilizer means. The stabilizer includes a vertically, upwardly extending brace which is yieldably, slideably received within appropriate bearing structure to allow vertical suspension displacement while preventing damage to the motorcycle frame from torsional or twisting forces.

5 Claims, 4 Drawing Figures

U.S. Patent     Sep. 8, 1981     4,287,960
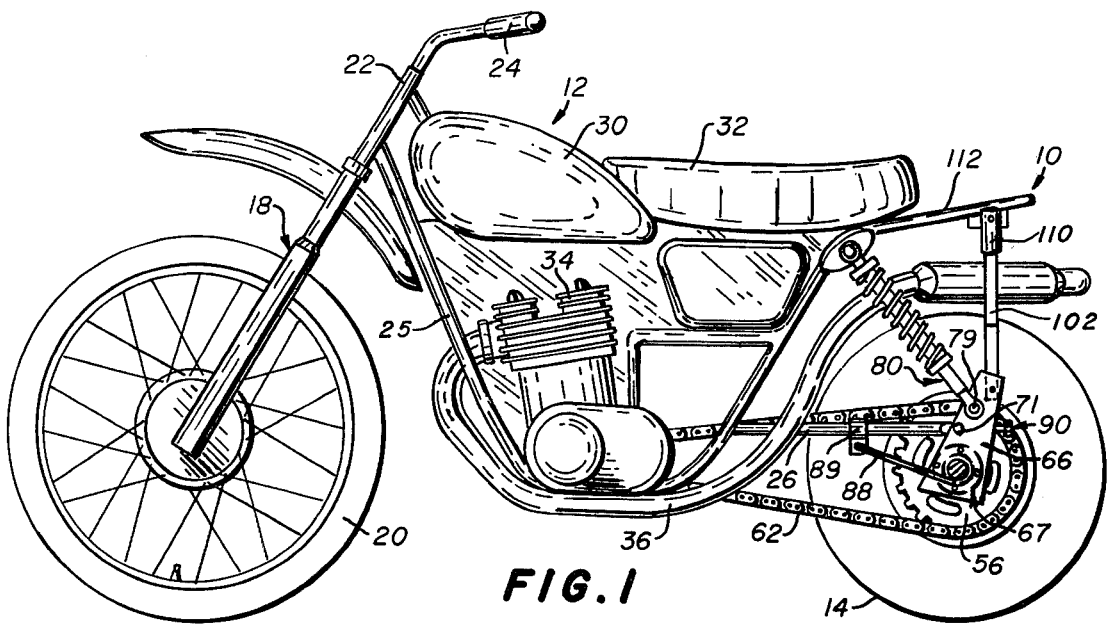
FIG.1
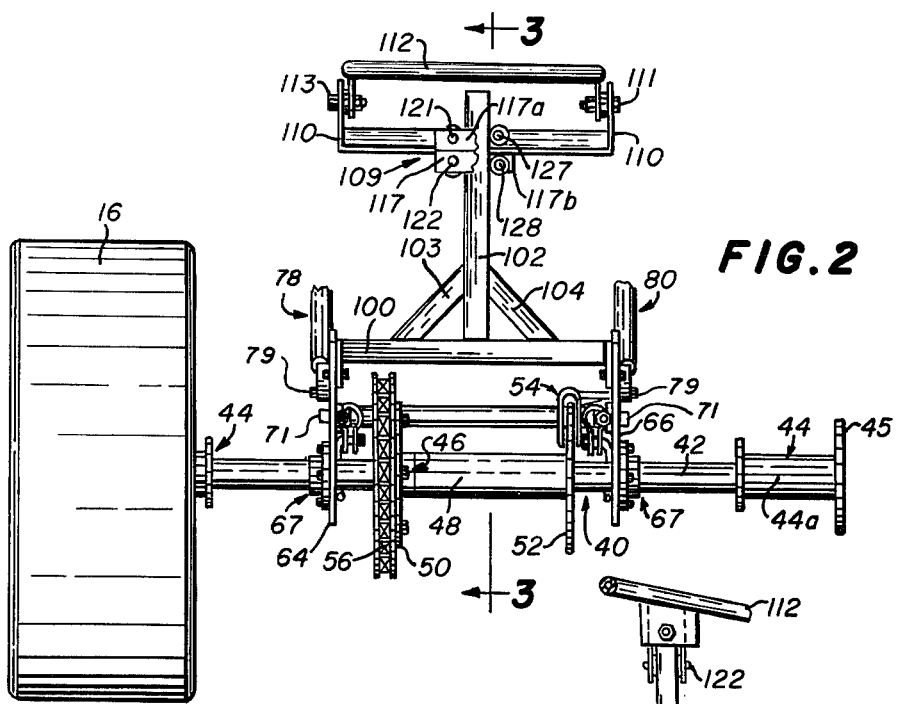
FIG.2
FIG.3
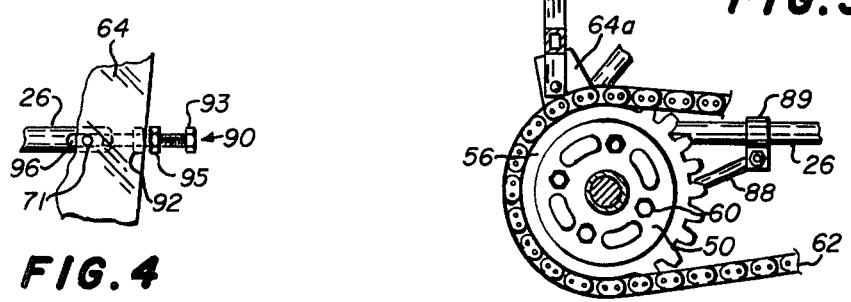
FIG.4

MOTORCYCLE CONVERSION KIT

BACKGROUND OF THE INVENTION

This invention relates to motorcycles. More particularly, the present invention relates to an add-on kit for converting conventional two wheel motorcycles to three wheel operation.

In the past a variety of three wheel motorcycles and self propelled vehicles have been proposed. Examples of the prior art may be seen in the following United States Pat. Nos.: 2,207,447; 1,383,933; 1,271,553; 2,633,030; 1,369,540; 3,583,727; 2,533,549; 4,003,443; and 1,876,155.

While several variations of the aforementioned theme have been employed in the art, no art known to applicant discloses a conversion kit which may be readily bolted on to an existing motorcycle, and which will properly compensate for resultant twisting forces. Although elaborate prior art assemblies exist for providing dual rear wheels, the purpose of my device is to provide synchronous drive for dirt or mud use, so that the separate suspension means and differential gearing system employed in U.S. Pat. No. 4,003,443, for example, are unneeded.

SUMMARY OF THE INVENTION

My invention comprises a conversion kit for conventional motorcycles for facilitating three wheel operation. The kit provides for locked, synchronous drive of both rear wheels to insure traction in mud or sand environments. However, to compensate for twisting forces produced by such drive, a stabilizer system is employed. The stabilizer resists twisting forces but allows vertical movement so that the standard equipment suspension system can function properly.

The kit preferably comprises an axle assembly adapted to be bolted to the rear of a motorcycle, and which receives the basic drive gear supplied with the motorcycle for rotation of the drive wheels. A pair of mounting plates placed on opposite sides of the axle means enable the apparatus to be bolted to the frame of the motorcycle. The axle is journaled for rotation relative to the mounting plates. The stabilizer preferably includes a vertically, upwardly extending brace yieldably received within a bearing system coupled to the motorcycle at an upper portion of the frame.

Therefore, an important object of this invention is to provide a bolt-on conversion kit for easily converting conventional motorcycles to three wheel operation.

A similar object of this invention is to provide a conversion kit of the character described which may be readily adapted for use with existing motorcycles.

Another object of this invention is to provide a conversion kit of the character described which will provide synchronous operation of the rear drive wheels without subjecting the motorcycle frame to excessive stresses.

Another object of this invention is to provide a three wheel conversion kit for motorcycles in which a stabilizer system will be compatible with vertical suspension system displacements.

These and other objects and advantages of this invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout to indicate like parts in the various views;

FIG. 1 is a side elevational view of a conventional motorcycle with the invention mounted thereon, with parts thereof broken away or shown in section for clarity;

FIG. 2 is an enlarged rear view showing the conversion kit with parts thereof broken away or shown in section for clarity;

FIG. 3 is a sectional view taken generally along line 3—3 in FIG. 2, with parts thereof broken away for clarity; and FIG. 4 is an enlarged view of the axle positioning means with parts broken away or omitted for clarity.

DETAILED DESCRIPTION OF THE DRAWING

Referring now to the drawings, the invention 10 thereshown is illustrated mechanically mounted on a conventional motorcycle 12. The purpose of the invention 10 is to facilitate the use of a pair of spaced apart drive wheels 14,16 in conjunction with operation of the motorcycle 12. It will be noted that motorcycle 12 comprises a conventional front fork 18 for mounting front wheel 20, and which is received within a steering assembly 22 for control via handle bars 24 in a conventional fashion. The main frame of the motorcycle 25 includes rearwardly projecting standard portion 26 which, as will be discussed in detail later, is rigidly coupled to the conversion kit 10. The gas tank 30, seat 32, drive motor 34, exhaust header 36, as well as other standard parts not shown, comprise conventional motorcycle components.

As best viewed in FIG. 2, an elongated axle assembly 40 comprises a rigid, generally cylindrical, elongated rod 42 terminating at each end thereof in hub assemblies 44 which terminate in integral, outer flange portions 45 adapted to be bolted to drive wheels 16,14 in the usual manner. Centrally, coaxially disposed about shaft 42 is a drive hub 46 including an elongated, tubular portion 48 which extends between a mounting flange 50 and a disc 52 for a braking system. The standard chain drive gear 56 provided with the motorcycle to be converted is bolted to the flange 50 through a plurality of nut and bolt assemblies 60 at radially spaced apart intervals. It will thus be apparent that in response to rotation of drive gear 56 by conventional chain 62, axle 42 will be forced to rotate and both wheels 14, 16 will be rotated.

A pair of substantially planar mounting plates 64,66 are revolvably coupled to the axle means at opposite sides of the drive gear system. It will be apparent that conventional bearing assemblies 67 are included to facilitate relative rotation between the mounting plates 64,66 and the axle member 42 journaled therethrough. As best viewed in FIG. 1, each mounting plate is adapted to be coupled to the frame of the motorcycle. For example, each mounting plate is adapted to be coupled to the rearwardly extending frame member 26 via clamps 89. Clamps 89 are linked to plates 64 or 66 via elongated struts 88, which are coupled to a bearing assembly 67. Each of the plates 64,66 are spaced apart in proper alignment during assembly by adjustment of alignment mechanism 90.

As shown in enlarged form in FIG. 4, the alignment system comprises a first nut 92 weldably secured to mounting plate 64. A bolt 93 extends toward engagement with the rearmost edge of rear frame 26. It will be apparent that a generally oval-shaped hole 96, conventionally provided in bike frame 26 enables relative horizontal adjustment of plate 64 relative to frame 26. Bolt 93 need merely be rotated with respect to nut 92 so as to position the conversion kit properly with respect to frame 26. The bolt and nut assembly 71 will thus be slideably secured within mounting hole 96. Once the conversion kit is appropriately positioned so that the drive chain 62 is tight enough for normal operation, and both rear drive wheels are aligned, mounting nuts 95 may be tightened to preserve proper alignment.

With reference to FIGS. 2 and 3, a stabilizer system is thereshown. During operation of the bike it will be apparent that both of the rear wheels are driven in unison. Since the converted bike is adapted for dirt and mud use, differential coupling of the drive wheels is disadvantageous. On the other hand, to alleviate various tortional stresses encountered with sychronous drive, the vertical stabilizer system to be described has been included.

The stabilizer system includes a first horizontal member 100 which is rigidly coupled between mounting plates 64 and 66 at an upper location thereon. It will be apparent that the horizontal member 100 is integral with a vertically upwardly extending member 102, which is braced to member 100 through first and second inclined reinforcement members 103,104. Bearing means 109 provided at an upper location attached to the motorcycle frame slideably vertically receives member 102 so that tortional deformation of the assembly is prevented, while vertical displacement thereof is allowed. Verticle suspension displacement which will normally be damped by shock absorbers 78,80 is thus allowed by the stabilizer. Shock absorbers 78, 80 are respectively secured to plates 64, 66 by conventional bolts 79.

The bearing structure 109 comprises a rigid, horizontal structure 110 which extends between opposite sides of the motorcycle rear frame member 112. It will be noted that a pair of conventional nut and bolt assemblies 111,113 will couple the bearing member 110 to the upper motorcycle frame 112. A bearing receptor 117 houses a first pair of vertically spaced-apart bearings 121,122 and a second pair of vertically spaced bearings 127,128 which slidably receive member 102.

Member 102 tightly fits within the receptor 117 between opposite sides 117 A and 117 B thereof between various bearings. It will be apparent (FIG. 2) that the bearing means thus ride against the sides of member 102 to facilitate verticle displacement thereof. Thus the stabilizer will facilitate verticle displacements in the motorcycle shock absorber system. On the other hand, it will be apparent that relative twisting between the motorcycle frame and the lower axle will be strongly resisted. With the construction shown member 102 will be maintained in a substantially vertical position notwithstanding shocks to the axle. The stabilizer will thus tend to prevent twisting of the frame, and it will maintain the axle means in proper position.

Thus the present conversion kit may be quickly adapted for use with conventional motorcycles. The entire assembly is thus adapted for bolt-on mounting on existing bikes. The present invention will provide synchronous dual wheel rotation or drive, and the resulting twisting forces otherwise experienced with such construction have been neutralized via the stabilizing system thereshown. As mentioned, no structural alterations in the shock absorbers originally provided on the motorcycle will be required.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A kit for converting a two wheel motorcycle to three wheel operation, said kit comprising:

elongated axle means adapted to be transversely coupled to said motorcycle at the rear thereof, said axle means adapted to receive a standard drive gear associated with said two wheel motorcycle for rotation thereby;

first and second substantially planar mounting plates revolvably coupled to said axle means at spaced-apart locations thereon at opposite sides of said drive gear;

means adapted to couple said first and second mounting plates to said motorcycle;

a pair of drive hubs disposed at opposite ends of said axle means adapted to receive first and second drive wheels for propelling said motorcycle; and stabilizer means comprising:

a horizontal member rigidly extending between said first and second mounting plates;

a vertical member rigidly attached to said horizontal member and rising upwardly therefrom; and bearing means adapted to be rigidly coupled to said motorcycle at an upward location thereon for slidably receiving said vertical stabilizer member whereby vertical displacement of a suspension system of said motorcycle is facilitated while damage to said motorcycle from twisting or torsional forces is prevented.

2. The combination as defined in claim 1 wherein said stabilizer bearing means comprises:

horizontal mounting means adapted to be coupled to said motorcycle; and, a plurality of roller bearings revolvably attached to said horizontal mounting means at a central location thereon.

3. The combination as defined in claim 1 wherein said motorcycle includes a frame and said bearing means comprises:

a first horizontal member adapted to be transversely attached to said bike on an upper portion of the frame thereof; and, first and second bearings rigidly, rotatably coupled to said last mentioned horizontal member for revolvably contacting opposite sides of said stabilizer vertical member.

4. The combination as defined in claim 3 wherein said first and second substantially planar mounting plates each include adjustment means for adjusting the tension of the motorcycle drive chain.

5. The combination as defined in claim 4 wherein said means adapted to couple said first and second mounting plates to said motorcycle comprises means adapted to attach said plates to conventional shock absorbers on said motorcycle and elongated reinforcement means extending forwardly from said plates and adapted to be connected at remote points of said frame.

* * * * *